United States Patent
Ebeling

(10) Patent No.: US 11,434,105 B2
(45) Date of Patent: Sep. 6, 2022

(54) SUSPENSION MEMBER LOAD SENSOR

(71) Applicant: Tim Ebeling, Toledo, OH (US)

(72) Inventor: Tim Ebeling, Toledo, OH (US)

( * ) Notice: Subject to any disclaimer, the term of this patent is extended or adjusted under 35 U.S.C. 154(b) by 437 days.

(21) Appl. No.: 16/495,864

(22) PCT Filed: Feb. 22, 2018

(86) PCT No.: PCT/US2018/019104
§ 371 (c)(1),
(2) Date: Sep. 20, 2019

(87) PCT Pub. No.: WO2018/190956
PCT Pub. Date: Oct. 18, 2018

(65) Prior Publication Data
US 2020/0048034 A1 Feb. 13, 2020

Related U.S. Application Data

(60) Provisional application No. 62/484,595, filed on Apr. 12, 2017.

(51) Int. Cl.
| | |
|---|---|
| *G01L 1/00* | (2006.01) |
| *B66B 1/34* | (2006.01) |
| *B66B 5/14* | (2006.01) |
| *G01G 19/18* | (2006.01) |
| *G01L 1/22* | (2006.01) |

(52) U.S. Cl.
CPC ............ *B66B 1/3484* (2013.01); *B66B 5/145* (2013.01); *G01G 19/18* (2013.01); *G01L 1/22* (2013.01)

(58) Field of Classification Search
CPC ...... B66B 1/3484; B66B 5/145; G01G 19/18; G01L 1/22
See application file for complete search history.

(56) References Cited

U.S. PATENT DOCUMENTS

| | | | | |
|---|---|---|---|---|
| 5,149,922 | A * | 9/1992 | Kondou | B66B 1/3484 187/401 |
| 6,021,873 | A * | 2/2000 | Aulanko | G01G 19/18 187/391 |
| 6,123,176 | A * | 9/2000 | O'Donnell | B66B 7/1215 187/393 |
| 6,450,299 | B1 * | 9/2002 | Lysaght | G01G 19/18 187/393 |

(Continued)

*Primary Examiner* — Max H Noori
*Assistant Examiner* — Masoud H Noori
(74) *Attorney, Agent, or Firm* — C. Fred Charpie, III; Ward Law Office LLC

(57) ABSTRACT

A suspension member load sensor configured for use with a suspension member in an elevator system is provided. The suspension member load sensor includes a housing bounded by an upper cover plate and a lower cover plate. The upper cover plate and the lower cover plates are configured to receive a rod extending therethrough. The lower cover plate is configured to seat adjacent a mounting plate. A strain gauge is disposed within the housing and configured to produce an electrical signal commensurate with a load on the suspension member. A plurality of spaced apart projections extend outwardly from a lower surface of the lower cover plate. The projections are configured to define a location for the introduction of force into the load sensor.

20 Claims, 6 Drawing Sheets

(56) References Cited

U.S. PATENT DOCUMENTS

| | | | |
|---|---|---|---|
| 7,784,589 B2* | 8/2010 | Fischer | B66B 5/145 |
| | | | 187/393 |
| 8,162,110 B2* | 4/2012 | Smith | B66B 1/3484 |
| | | | 187/412 |
| 9,045,313 B2* | 6/2015 | Benosman | B66B 7/06 |
| 9,624,073 B2* | 4/2017 | Roivainen | B66B 11/0273 |
| 11,198,519 B1* | 12/2021 | Seeley | B64C 39/024 |
| 2005/0087404 A1* | 4/2005 | Barrett | B66B 1/3484 |
| | | | 187/413 |
| 2009/0120733 A1* | 5/2009 | Mustalahti | B66B 7/10 |
| | | | 187/404 |

* cited by examiner

SUSPENSION MEMBER LOAD SENSOR

RELATED APPLICATIONS

This application claims the benefit of U.S. Provisional Application No. 62/484,595, filed Apr. 12, 2017, the disclosure of which is incorporated herein by reference in its entirety.

BACKGROUND

The operation of an elevator can include the functions of starting, stopping, acceleration, deceleration, high-speed travel and leveling. These functions can be affected by the weight and/or load of the people and objects located within the elevator car and the weight of the elevator car itself (hereafter collectively referred to as the "load"). Accordingly, it is desirable that the load within the elevator car be known at all times.

The load within the elevator car can also affect other operations and mechanisms of the elevator. As one non-limiting example, the load within the elevator car can affect the tension on suspension members configured to support the elevator car. In another non-limiting example, if the elevator car is overloaded with excess load, it can be difficult to maintain an elevator brake in a locked arrangement and prevent movement of the elevator car. In yet another non-limiting example, the load within the elevator car can be used to determine which building floor should be a destination floor.

Several types of elevator load weighing systems have been used including the non-limiting examples of sensors positioned beneath the cab platform, sensors attached to the suspension members, sensors mounted to a crosshead and the like. In the instances where the load sensors are positioned beneath the cab platform, it is known to measure the deformation of resilient pads disposed under the cab platform. Disadvantages of these types of deformation systems include an inaccuracy introduced by hysteresis in the elastomeric material used in the pads, signal drift due to hardening of the elastomeric and/or rubber pads, hardening of the elastomeric and/or rubber pads over time and the hardening of the different elastomeric and/or rubber pads at different rates. Further, in some systems, the aging of the elastomeric and/or rubber pads can cause erroneous weight measurements as the relationship of the deformation of the pads and the resulting weight signal becomes non-linear.

It would be advantageous elevator load sensors could be improved.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the suspension member load sensor.

The above objects as well as other objects not specifically enumerated are achieved by a suspension member load sensor configured for use with a suspension member in an elevator system. The suspension member load sensor includes a housing bounded by an upper cover plate and a lower cover plate. The upper cover plate and the lower cover plates are configured to receive a rod extending therethrough. The lower cover plate is configured to seat adjacent a mounting plate. A strain gauge is disposed within the housing and configured to produce an electrical signal commensurate with a load on the suspension member. A plurality of spaced apart projections extend outwardly from a lower surface of the lower cover plate. The projections are configured to define a location for the introduction of force into the load sensor.

The above objects as well as other objects not specifically enumerated are also achieved by a suspension member load sensor configured for use with a suspension member in an elevator system. The suspension member load sensor includes a housing bounded by an upper cover plate and a lower cover plate. The upper cover plate and the lower cover plates are configured to receive a rod extending therethrough. A strain gauge is disposed within the housing and configured to produce an electrical signal commensurate with a load on the suspension member. An upper swash plate is in contact with the lower cover plate. The upper swash plate has an annular race located on an upper surface. The upper swash plate is configured to receive a rod extending therethrough. A lower swash plate is in contact with the upper swash plate. The lower swash plate is configured to receive a rod extending therethrough and further configured to seat against a mounting plate. The upper swash plate is configured for rotation relative to the lower swash plate.

The above objects as well as other objects not specifically enumerated are also achieved by an elevator fixture configured for use with a plurality of suspension members in an elevator system. The elevator fixture includes a plurality of suspension members configured to support an elevator car. A suspension member socket is connected to each of the suspension members. A threaded rod extends from each of the suspension member sockets. A mounting plate has a plurality of apertures configured to receive the threaded rods extending therethrough. A lower swash plate is configured to receive one of the rods extending therethrough and further configured to seat against the mounting plate. An upper swash plate is in contact with the lower swash plate. The upper swash plate has an annular race located on an upper surface. The upper swash plate is configured to receive one of the rods extending therethrough. A suspension member load sensor is configured to receive one of the rods extending therethrough and further configured to produce an electrical signal commensurate with the load on the suspension member.

Various aspects of the suspension member load sensor will become apparent to those skilled in the art from the following detailed description of the illustrated embodiments, when read in light of the accompanying drawings.

DETAILED DESCRIPTION

The suspension member load sensor will now be described with occasional reference to the specific embodiments. The suspension member load sensor may, however, be embodied in different forms and should not be construed as limited to the embodiments set forth herein. Rather, these embodiments are provided so that this disclosure will be thorough and complete, and will fully convey the scope of the suspension member load sensor to those skilled in the art.

Unless otherwise defined, all technical and scientific terms used herein have the same meaning as commonly understood by one of ordinary skill in the art to which the suspension member load sensor belongs. The terminology used in the description of the suspension member load sensor herein is for describing particular embodiments only and is not intended to be limiting of the suspension member load sensor. As used in the description of the suspension member load sensor and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the suspension member load sensor. Notwithstanding that the numerical ranges and parameters setting forth the broad scope of the suspension member load sensor are approximations, the numerical values set forth in the specific examples are reported as precisely as possible. Any numerical values, however, inherently contain certain errors necessarily resulting from error found in their respective measurements.

In accordance with the illustrated embodiments, a suspension member load sensor (hereafter "load sensor") is provided. Generally, the load sensor is axially mounted relative to a suspension member and configured to sense the load incurred by the suspension member. The load sensor includes a plurality of projections extending from a lower cover plate. The projections are configured to define a location for the introduction of force into the load sensor. That is, the load sensor receives a compressive force on the suspension member at a defined location that contributes to the reliable and repeatable operation of the load sensor.

Figure 1:
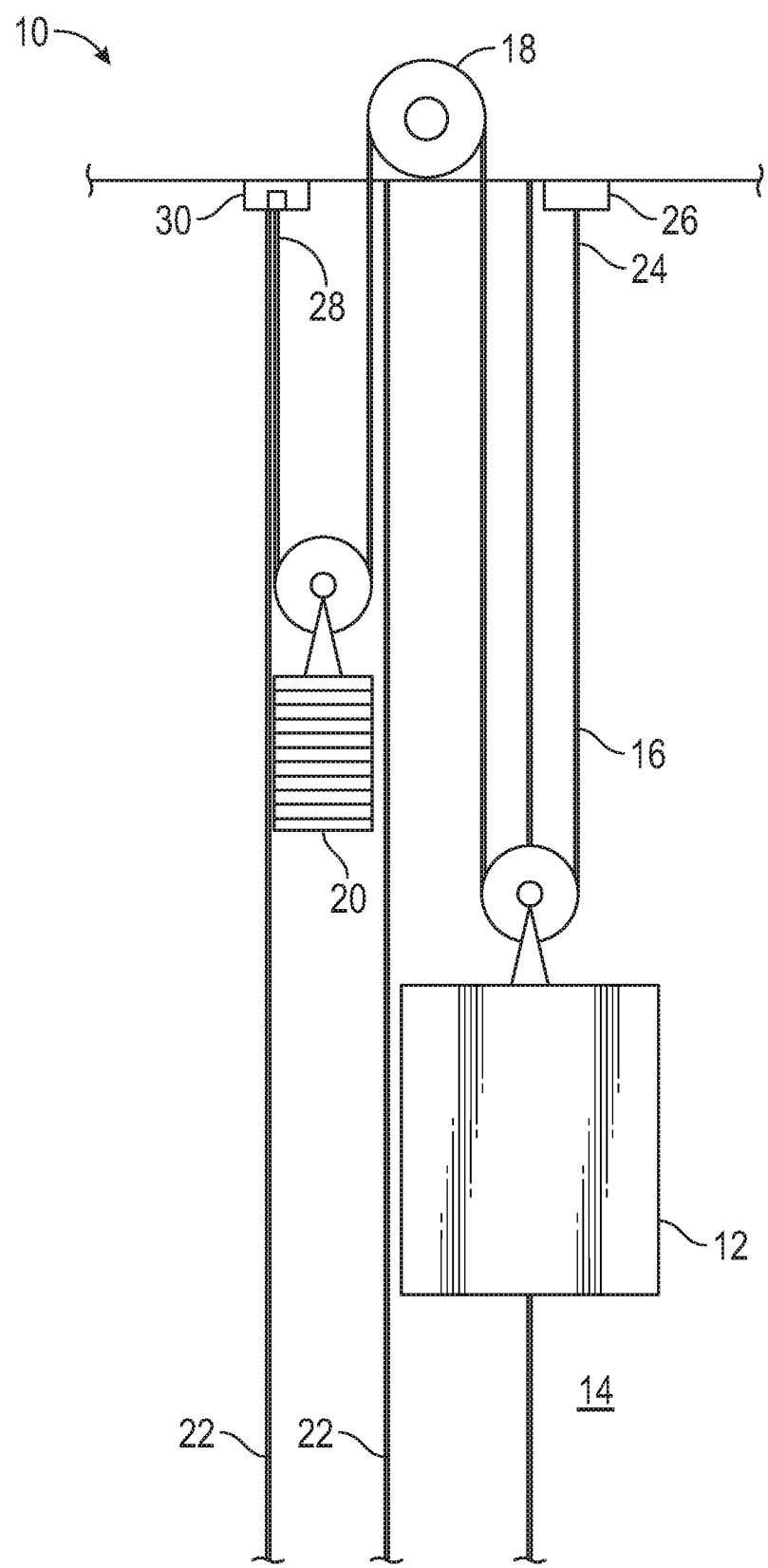
FIG. 1 is a side view of portions of an elevator system including a first and second elevator fixture.

Referring now to the drawings, there is illustrated in FIG. 1 a diagrammatic and simplified view of a traction elevator 10 (hereafter "elevator"). Portions of the elevator 10 are conventional in the art and will only be briefly described herein. The elevator 10 includes an elevator car 12, moving in a substantially vertical direction on opposing car guide rails (not shown for purposes of clarity). The elevator car 12 and the car guide rails are disposed in an elevator hoistway 14. The elevator hoistway 14 can be defined by hoistway walls or by other structures, assemblies and components, such as the non-limiting example of structural divider beams and the like. The elevator car 12 is supported by a first segment of one or more suspension members 16, which are moved with an elevator machine 18. The suspension members 16 can have any desired structure, including the non-limiting examples of multiple ropes or flat belts.

Referring again to FIG. 1, a second segment of the one or more suspension members 16 is configured to support a counterweight assembly 20. The counterweight assembly 20 is configured to balance a portion of the weight of the elevator car 12 and the rated capacity of the elevator car 12. The counterweight assembly 20 moves in a substantially vertical direction on opposing counterweight guide rails 22.

Referring again to FIG. 1, the hoistway 14 can be vertically divided into building floors (not shown). The building floors can have entrances configured to facilitate ingress into and egress out of the elevator car 12.

Referring again to FIG. 1, a first end 24 of the suspension members 16 can be secured to a first fixture 26. In a similar manner, a second end 28 of the suspension members 16 can be fixed to a second fixture 30.

Figure 2:
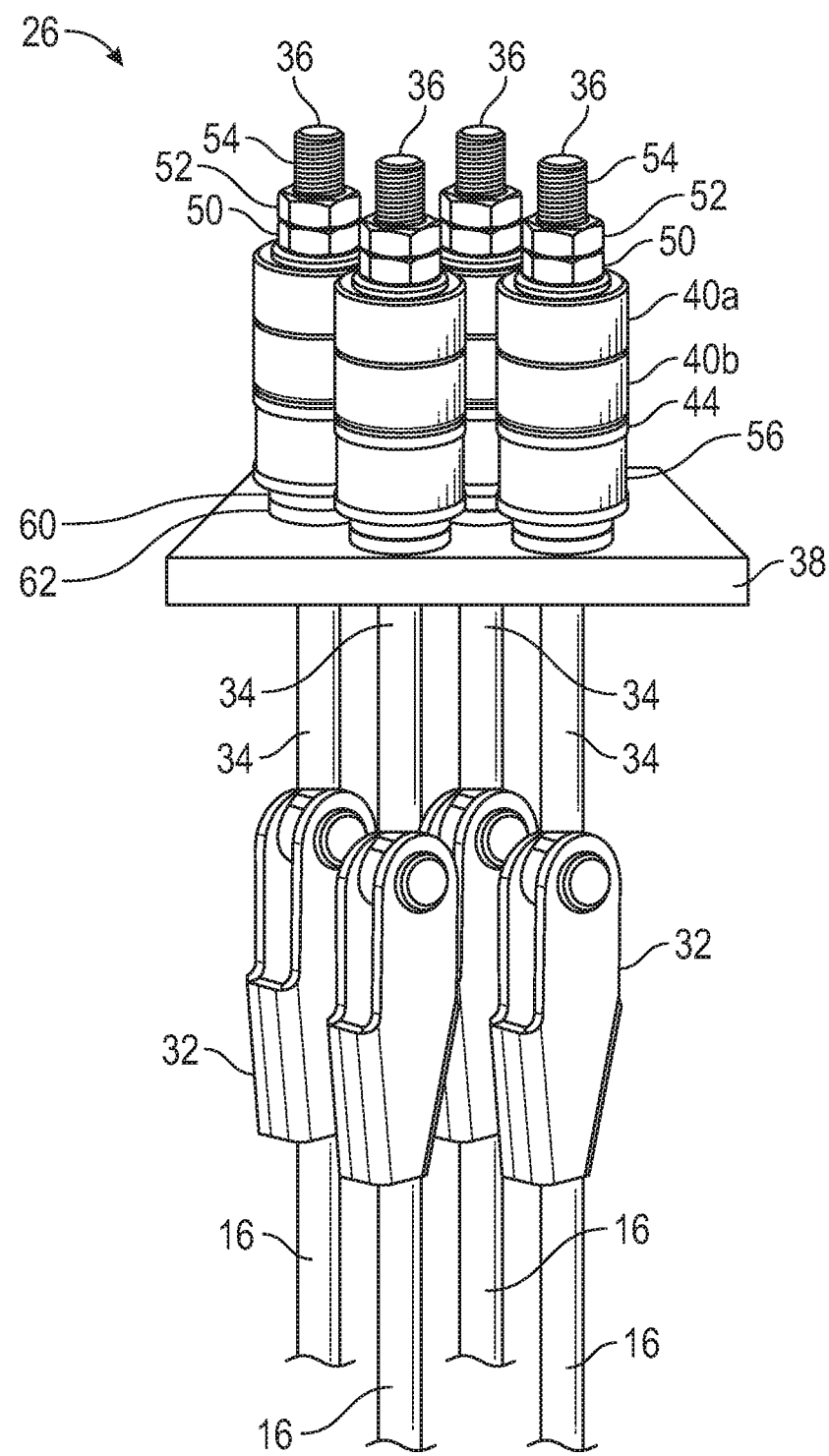
FIG. 2 is a perspective view of a first fixture of the elevator system of FIG. 1.
Figure 3:
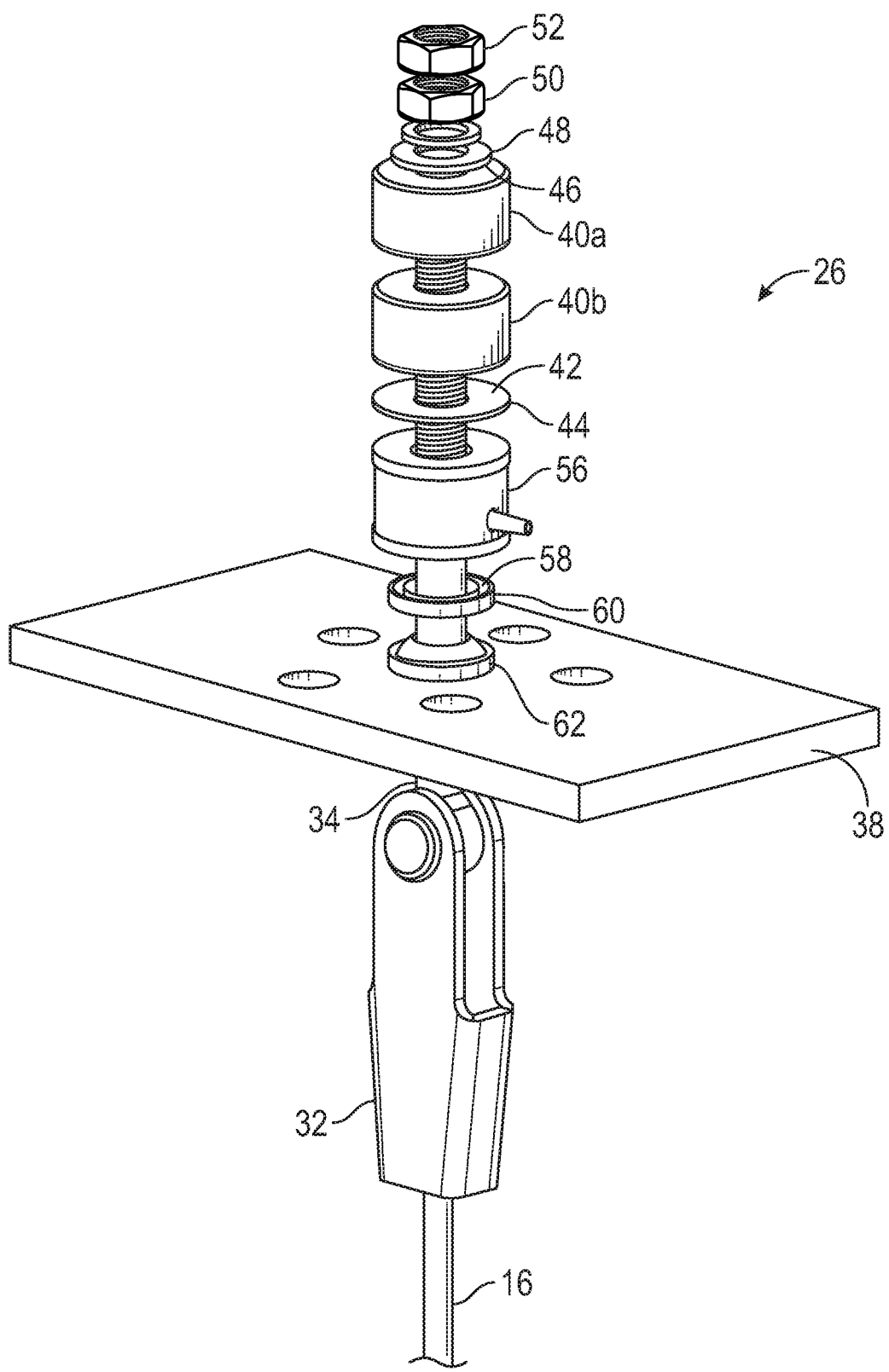
FIG. 3 is an exploded perspective view of the first fixture of the elevator system of FIG. 1.

Referring now to FIGS. 2 and 3, the first fixture 26 is illustrated. The first fixture 26 can be illustrative of the second fixture 30. Each suspension member 16 is attached to a separate suspension member socket 32. The suspension member socket 32 includes a rod 34 having a threaded end 36. The rod 34 extends in a substantially vertical orientation through a mounting plate 38. The mounting plate 38 is designed for minimal deflection and may be fixed to any suitable structural members, including the non-limiting examples of a car or counterweight guide rail, machine beam, hoistway wall, sufficient to support the weight of the car 12. However, in other embodiments, the mounting plate 38 may be eliminated and the suspension member terminations can be attached directly to the other suitable structures.

Referring again to FIGS. 2 and 3, the first fixture 26 includes a first buffer 40a and a second buffer 40b. The first and second buffers 40a, 40b are arranged to be adjacent to each other and axially aligned with the rod 34. The first and second buffers 40a, 40b are held in place between an upper surface 42 of an intermediate washer 44 and a lower surface 46 of an upper washer 48 by a first nut 50, a lock nut 52 and cotter pin 54. In the illustrated embodiment, each of the first and second buffers 40a, 40b is configured to exert an axial force on the rod 34 and has the form of a compression spring. In alternate embodiments, the first and second buffers 40a, 40b can have other forms. In still other alternate embodiments, a single buffer or spring can be used.

Referring again to FIGS. 2 and 3, a load sensor 56 is positioned between the intermediate washer 44 and an upper surface 58 of an upper swash plate 60. A lower swash plate 62 is positioned between the upper swash plate 60 and the mounting plate 38. The load sensor 56 has an annular shape, thereby defining a hole through which the rod 34 passes.

Referring again to FIGS. 2 and 3, a portion of the weight of the elevator car 12, and a load formed by the contents of the elevator car 12 (collectively defined as the "load") is borne by each suspension member 16. The load is sensed by the corresponding load sensor 56, which is compressed between the buffers 40a, 40b and the mounting plate 38 in proportion to the load.

Figure 4:
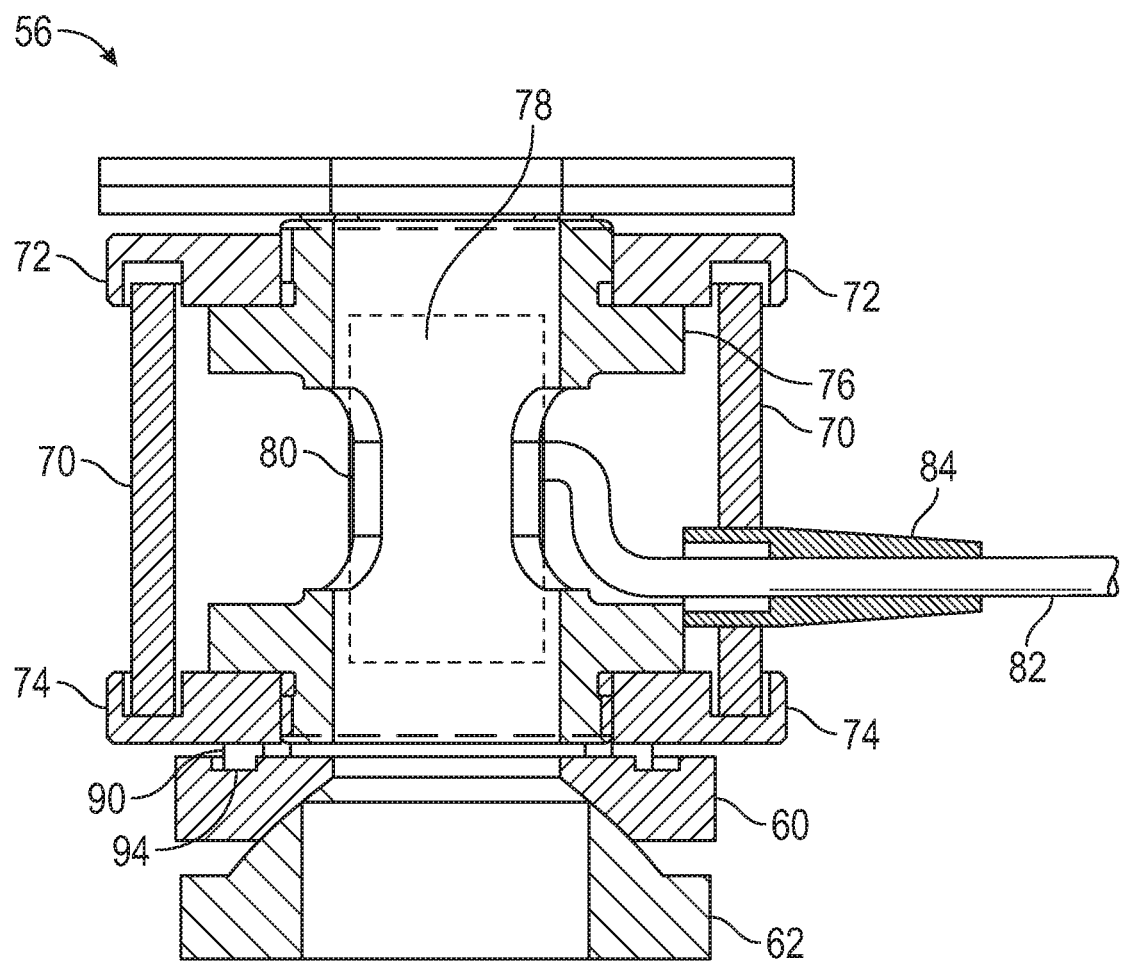
FIG. 4 is a side view, in elevation, of a load sensor of the first fixture of the elevator system of FIG. 1.

Referring now to FIG. 4, a cross-sectional view of the load sensor 56 is illustrated. The load sensor 56 is seated on the upper swash plate 60. The upper swash plate 60 is seated on the lower swash plate 62. The swash plates 60, 62 will be discussed in more detail below.

Referring again to FIG. 4, the load sensor 56 includes a housing 70, an upper cover plate 72 and an opposing lower cover plate 74. The housing 70 and cover plates 72, 74 are configured to enclose a sensor body 76. The sensor body 76 is configured to support an optional circuit board 78. The optional circuit board 78 is configured to support a strain gauge 80 and further configured to amplify and condition signals emanating from the stain gauge 80. While the embodiment of the load sensor 56 shown in FIG. 4 illustrates the optional circuit board 78 as being positioned within the interior of the housing 70, upper cover plate 72 and lower cover plate 74, it is within the contemplation of the load sensor 56 that the circuit board 78 can have other locations including locations external to the load sensor 56.

Referring again to FIG. 4, the strain gauge 80 is configured to produce an electrical signal commensurate with the load on the suspension member 16. In the illustrated embodiment, the strain gauge 80 has the form of bonded foil stranded and full bridge strain gauge. However, other forms of strain gauges can be used.

Referring again to FIG. 4, a signal from each load sensor 56 can be summed together to obtain the total load of the elevator car and the contents therewithin. The signals may also be analyzed individually to determine the portion of the load carried by each suspension member 16.

Referring again to FIG. 4, an electrically conductive cable 82 is in electrical communication with the strain gauge 80 and is configured to receive the electrical signals produced by the strain gauge 80. The cable 82 can have any desired form sufficient to receive the electrical signals produced by the strain gauge 80. Optionally, the cable 82 can include a protective sleeve 84 configured to protect the cable from unintended damage.

Referring again to FIG. 2, in operation, the load on each suspension member 16 can be measured and the load carried by each suspension member 16 can be equalized by either tightening or loosening the buffers 40a, 40b. The buffers 40a, 40b are tightened or loosened by tightening or loosening the first nut 50 and the lock nut 52. By measuring the load in each suspension member 16, individually, any stretching of degradation of the suspension members 16 can also be sensed as the loads carried by each suspension member 16 varies over time.

Figure 5:
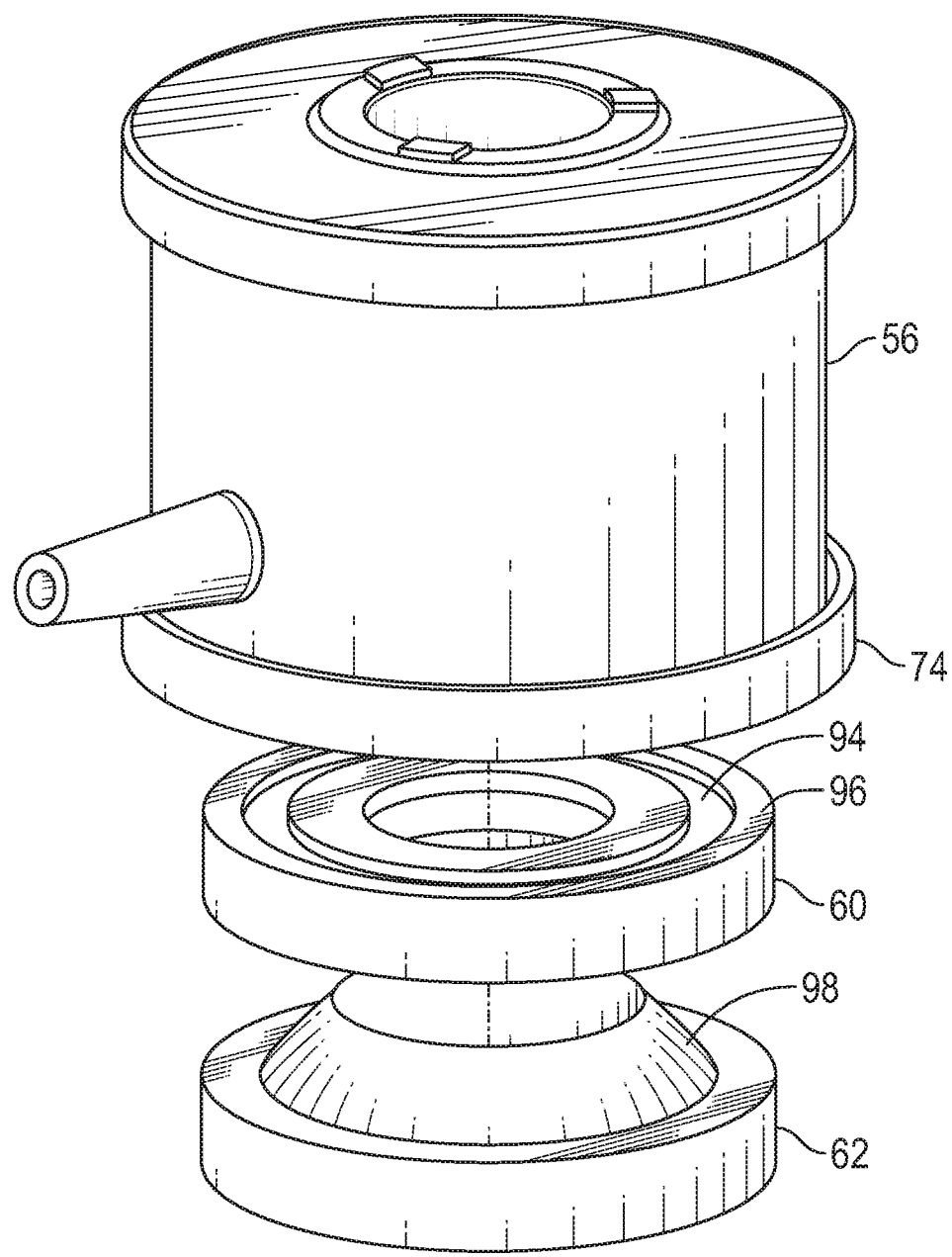
FIG. 5 is a perspective view of the load sensor of FIG. 4, shown in relation to an upper and lower swash plate.
Figure 6:
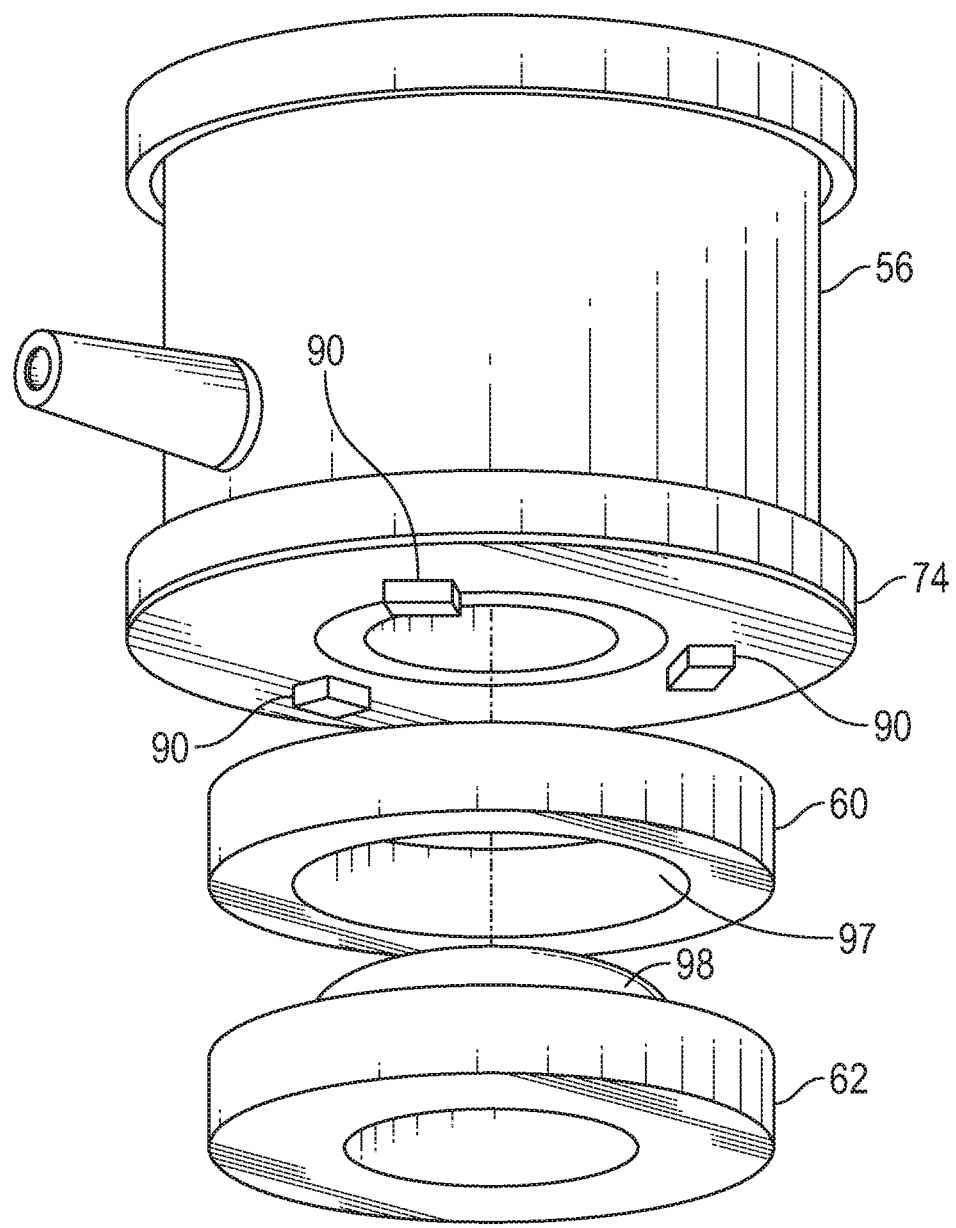
FIG. 6 is a perspective view of the load sensor of FIG. 4, shown in relation to an upper and lower swash plate, further illustrating a plurality of projections extending from a lower cover plate of the load sensor.

Referring now to FIGS. 4-6, the load sensor 56, upper swash plate 60 and lower swash plate 62 are illustrated. The load sensor 56 includes the lower cover plate 74. Referring now to FIG. 6, a plurality of spaced-apart projections 90 extend from a lower surface 92 of the lower cover plate 74. The projections 90 extend in a direction toward the upper swash plate 60. In the illustrated embodiment, a quantity of three (3) projections 90 are spaced-apart on a consistent radius by equal 120° angles. The consistent radius of the equally spaced-apart projections 90 is configured to define a location for the introduction of force into the load sensor 56. That is, the load sensor 56, receives the compressive force at defined locations of the lower cover plate 74. Without being held to the theory, it is believed the defined location of the introduction of force into the load sensor 56 contributes to the reliable and repeatable operation of the load sensor 56. However, in other embodiments, more or less than three (3) projections can be used and the projections can be spaced apart by other angles sufficient to define a location for the introduction of force into the load sensor.

Referring now to FIG. 5, the upper swash plate 60 includes an annular race 94 located at an upper surface 96 of the upper swash plate 60. The race 94 is configured to receive the projections 90 extending from the lower surface 92 of the lower cover plate 74. In this manner, the upper swash plate 60 is radially centered about the load sensor 56 and the projections 90, seated in the race 94, prevent radial sliding of the load sensor 56. Without being held to the theory, it is believed the structure of the seated projections 90 within the race 94 contributes to the location of the defined force introduction of the load sensor 56, which thereby contributes to the accurate, reliable and repeatable operation of the load sensor 56.

Referring again to FIG. 6, the projections 90 have the form of cubes or squares. However, in other embodiments, the projections 90 can have other forms, such as the non-limiting example of a circular structure, sufficient to be received in the race 94 of the upper swash plate 60 and contribute to the location of the defined force introduction of the load sensor 56.

Referring now to FIGS. 5 and 6, the upper swash plate 60 includes an annular recess 97 configured to receive a mating annular projection 98 extending from the lower swash plate 62. The recess 97 of the upper swash plate 60 and the projection 98 are configured for several functions. First, the recess 97 of the upper swash plate 60 and the projection 98 are configured such that upper swash plate 60 and the lower swash plate 62 can rotate relative to each other in a manner such as to compensate for misalignment of the mounting plate 38 and the rod 34 extending upward through the mounting plate. Second, since the recess 97 of the upper swash plate 60 and the projection 98 are configured to rotate relative to each other, the upper swash plate 60 and the lower swash plate 62 cooperate with each other to contribute to the location of the defined force introduction of the load sensor 56.

Referring again to embodiment illustrated in FIGS. 5 and 6, the annular recess 97 has the form of a hollow socket and the annular projection 98 has the form of a hollow dome. However, in other embodiments, the annular recess 97 and the annular projection 98 can have other mating forms sufficient for the functions described herein.

The principle and mode of operation of the suspension member load sensor has been described in certain embodiments. However, it should be noted that the suspension member load sensor may be practiced otherwise than as specifically illustrated and described without departing from its scope.

What is claimed is:

1. A suspension member load sensor configured for use with a suspension member in an elevator system, the suspension member load sensor comprising:
   a housing bounded by an upper cover plate and a lower cover plate, the upper cover plate and the lower cover plates configured to receive a rod extending therethrough, the lower cover plate configured to seat adjacent a mounting plate;
   a strain gauge disposed within the housing and configured to produce an electrical signal commensurate with a load on the suspension member; and
   a plurality of spaced apart projections extending outwardly from a lower surface of the lower cover plate, the projections configured to define a location for the introduction of force into the load sensor.

2. The suspension member load sensor of claim 1, wherein the projections have the form of a cube.

3. The suspension member load sensor of claim 1, wherein the projections are spaced-apart on a consistent radius by equal 120° angles.

4. The suspension member load sensor of claim 1, wherein the projections are received by a race disposed in an upper swash plate.

5. The suspension member load sensor of claim 4, wherein the race in the upper swash plate is configured to prevent sliding of the load sensor in a radial direction.

6. The suspension member load sensor of claim 1, wherein a plurality of buffers or springs can be disposed along each of the rods and configured to equalize the tension in the suspension members.

7. A suspension member load sensor configured for use with a suspension member in an elevator system, the suspension member load sensor comprising:
  a housing bounded by an upper cover plate and a lower cover plate, the upper cover plate and the lower cover plates configured to receive a rod extending therethrough;
  a strain gauge disposed within the housing and configured to produce an electrical signal commensurate with a load on the suspension member;
  an upper swash plate in contact with the lower cover plate, the upper swash plate having an annular race located on an upper surface, the upper swash plate configured to receive a rod extending therethrough; and
  a lower swash plate in contact with the upper swash plate, the lower swash plate configured to receive a rod extending therethrough and further configured to seat against a mounting plate;
  wherein the upper swash plate is configured for rotation relative to the lower swash plate.

8. The suspension member load sensor of claim 7, wherein the upper swash plate includes a plurality of projections extending from a lower surface.

9. The suspension member load sensor of claim 8, wherein the projections are received within an annular race positioned in the lower swash plate.

10. The suspension member load sensor of claim 7, wherein the upper swash plate includes a hollow socket.

11. The suspension member load sensor of claim 10, wherein the lower swash plate includes a hollow dome.

12. The suspension member load sensor of claim 7, wherein the upper swash plate includes a race configured to receive a plurality of projections extending from the suspension member load sensor.

13. The suspension member load sensor of claim 7, wherein the housing includes a circuit board configured to support the strain gauge.

14. An elevator fixture configured for use with a plurality of suspension members in an elevator system, the elevator fixture comprising:
  a plurality of suspension members configured to support an elevator car;
  a suspension member socket connected to each of the suspension members;
  a threaded rod extending from each of the suspension member sockets;
  a mounting plate having a plurality of apertures configured to receive the threaded rods extending therethrough;
  a lower swash plate configured to receive one of the rods extending therethrough and further configured to seat against the mounting plate;
  an upper swash plate in contact with the lower swash plate, the upper swash plate having an annular race located on an upper surface, the upper swash plate configured to receive one of the rods extending therethrough; and
  a suspension member load sensor configured to receive one of the rods extending therethrough and further configured to produce an electrical signal commensurate with the load on the suspension member.

15. The elevator fixture of claim 14, wherein the suspension member load sensor includes a plurality of spaced apart projections extending outwardly from a lower surface of the lower cover plate.

16. The elevator fixture of claim 15, wherein the plurality of projections are received by an upper swash plate.

17. The elevator fixture of claim 16, wherein the upper swash plate includes an internal socket configured to receive a dome shaped projection extending from a lower swash plate.

18. The elevator fixture of claim 17, wherein the upper swash plate is configured to rotate relative to the lower swash plate.

19. The elevator fixture of claim 14, wherein a plurality of buffers are positioned in contact with the suspension member load sensor, the plurality of buffers configured to receive one of the rods extending therethrough.

20. The elevator fixture of claim 17, wherein the suspension member load sensor includes a circuit board configured to support a strain gauge.

\* \* \* \* \*